US005205601A

United States Patent [19]

Ferris

[11] Patent Number: 5,205,601

[45] Date of Patent: Apr. 27, 1993

[54] AMBULANCE LOCK

[75] Inventor: Kenneth R. Ferris, Scarborough, Australia

[73] Assignee: Ferno-Washington, Inc., Wilmington, Ohio

[21] Appl. No.: 928,516

[22] Filed: Aug. 11, 1992

[30] Foreign Application Priority Data

Aug. 30, 1991 [AU] Australia .............................. PK8046

[51] Int. Cl.[5] .............................................. B60N 1/02

[52] U.S. Cl. ............................................ 296/20; 410/7

[58] Field of Search ...................... 296/65.1, 20; 410/7, 410/8, 9, 10, 11, 19, 22, 23

[56] References Cited

U.S. PATENT DOCUMENTS

| | | | |
|---|---|---|---|
| 3,869,144 | 3/1975 | Cwycyshyn et al. | 410/8 |
| 4,257,644 | 3/1981 | Stephens | 296/65.1 |
| 4,457,551 | 7/1984 | Anthony | 296/65.1 |
| 4,496,271 | 1/1985 | Spinosa et al. | 410/105 |
| 4,623,289 | 11/1986 | Apostolas | 410/7 |
| 4,688,843 | 8/1987 | Hall | 296/65.1 |
| 4,690,364 | 9/1987 | Constantin | 296/65.1 X |
| 5,092,722 | 3/1992 | Reazer, III et al. | 410/104 |

*Primary Examiner*—Robert R. Song

*Attorney, Agent, or Firm*—Frost & Jacobs

[57] ABSTRACT

A system for securing stretchers in ambulances and the like. The system has three parts: a part for mounting on the floor near the door through which the stretcher is passed, a part for mounting on the floor forwardly of the door mounting part, and an interconnecting mechanism. The part near the door is manipulable by a handle and includes a hooking member. The forwardly located part includes fixed and pivotal angled restraints which lock onto the undercarriage of the stretcher, and the interconnecting mechanism enables disengagement of the stretcher when the handle is manipulated. The system meets the DRAFT SPECIFICATION TO GOVERN THE STRETCHER RETENTION SYSTEM FOR AUSTRALIAN AMBULANCES.

20 Claims, 3 Drawing Sheets

AMBULANCE LOCK

TECHNICAL FIELD

1. This invention relates to fastening systems and is particularly concerned with systems for securing stretchers in ambulances and other patient transport vehicles.

BACKGROUND ART

In addition to various safety regulations and government standards, general concern for quality and reliability requires the stretcher to be firmly restrained in the event that the vehicle undergoes sudden driving manoeuvres, or crashes. The stretcher must be able to meet a forward pull of 6,000 lbs., a vertical pull of 3,000 lbs., a lateral pull of 3,000 lbs. and a rearward pull of 3,900 lbs., to meet the standard.

There are a number of types of stretcher fastening systems currently available. These are basically either floor mounting systems or a combination of floor and wall mounting systems. The floor mounting systems generally consist of a permanent floor mount fixed to the forward end of the vehicle but in place of the movable fastening hook on the rear of the vehicle, there is a rail mounted on the interior sidewall at the rear end of the vehicle, which includes a sliding rotatable fastener which looks onto a side member of the stretcher.

Both these systems suffer from a number of disadvantages, prime among which are their inability to meet the aforementioned new DRAFT SPECIFICATION.

DISCLOSURE OF THE INVENTION

It is therefore an object Of the present invention to provide a stretcher fastening system which will meet the new draft specification.

It is another object of the invention to provide a stretcher fastening system which will not obstruct the movement of the stretcher when being loaded into or unloaded from an ambulance.

According to the present invention, there is provided a stretcher frame securing system for a patient transport vehicle having a rearwardly located patient access, said system comprising a part for mounting on the floor of the transport vehicle adjacent said access, a part for mounting on the floor forwardly of said access, and an actuating mechanism connecting said parts; said forwardly mounting part including fixed and pivotal angled restraints for securing a stretcher frame wherein said fixed angled restraint inclines upwardly and rearwardly in a direction toward said vehicle access and said pivotal angled restraint is adapted to pivot between an orientation in which it inclines downwardly and rearwardly to said vehicle access, and an orientation in which it inclines upwardly and forwardly of said vehicle; said part adjacent the access including a longitudinally movable handle and associated hooking member which pivots between a horizontal plane and a vertical plane upon movement of the handle in a direction toward said access, said pivotal action of said hooking member being accompanied by a longitudinal movement which takes the hooking member into and out of locking correspondence with an appendage on the rear section Of the stretcher; said interconnecting actuating mechanism acting to pivot said pivotal angled restraint upon longitudinal movement of the handle, so that the pivotal angled restraint in combination with the fixed restraint secures the stretcher frame therebetween.

The pivoting action of the rear mounting part is such that the hooking member lies very close to the floor of the vehicle and thereby avoids any possible contact with the undercarriage of the stretcher. Furthermore, the nature of the rear mounting part enables it to have a very shallow construction so that this, too, does not give rise to any obstruction as is the case with existing locking arrangements.

The secure movement blocking action provided by the combination of fixed and pivotal angled restraints more than meets the draft specification requirements for movement in vertical and horizontal directions, and the hooking member on the rear mounting part ensures that vertical and lateral movement of the stretcher compliments such restraint in movement.

The stretcher fastening system will usually be positioned to one side of the patient transport vehicle between conventional floor runners which guide the stretcher to the looking location. When the stretcher has reached the locking location, a cross-member which forms part of the stretcher undercarriage framework is urged against the fixed angled restraint. The pivotal restraint is then rotated about the cross-member to a vertical orientation to restrain the stretcher from movement by manipulation of said handle Whilst such an action can be performed by a single fixed and a single pivotal angled restraint, it is preferable to have two of each of such restraints at spaced lateral locations to avoid the possibility of the stretcher moving sideways Most preferably, the pairs of restraints are fitted to a common plate which, in turn, is bolted through the floor of the vehicle to suitably positioned reinforcing members beneath the floor which are connected to, or form part of, the chassis.

Most preferably, each pivotal restraint is fitted by means of a pivot pin to the inner side of the respective fixed restraint and in its normal location, that is, it's non-restraining location, is maintained under it's own weight so as to be orientated at an angle of approximately forty-five degrees with respect to the vertical. Rotation of the pivot restraint can be effected by movement of a block under a lower surface thereof so as to simultaneously raise the pivot restraint from its freely resting position To this end, the pivot restraint has a tapered, forwardly facing surface against which the block can readily slide In the preferred embodiment where there are two pivot restraints spaced apart on a support plate, the two blocks are formed on the ends of a common shaft which slides over the plate, and comprise part of the aforementioned actuating mechanism.

The rear mounting plate, when not in engagement with a stretcher, will assume an arrangement in which it lies flat against the floor of the vehicle. Usually, the rear mounting part will not extend higher than about 25 mm when in the unengaged position. This provides more than enough clearance for a stretcher when it is being loaded into, Or unloaded from the vehicle.

Preferably, the handle is a tubular or solid looped rod with a grip portion extending transversely with respect to the vehicle to which it is fitted. The handle is suitably pivotally connected at its forward end in a housing or by similar means, so that it can be raised from a resting position on the floor of the vehicle to a position which enables easy manipulation.

At it's forward end, the handle is also connected by a rectangular plate, or the like, to the interconnecting actuating mechanism, and to a rod on which the hooking member is located. Preferably, connection to the rod is by means of a collar which enables the rod to rotate therein as hereinafter described. The rod is freely moveable in a longitudinal direction within a partially cut-away tubular housing which is adapted for bolting either directly to the floor of the vehicle or to a suitable sub-floor brace plate to which it is welded or otherwise affixed.

The hooking member projects through the cut-away section of the tubular housing and is formed integrally with the rod which moves therein. The hooking member may comprise an angular plate with a short pin extending therefrom parallel to the axis of the rod and in a direction pointing towards the rear of the vehicle; that is, in a direction away from the forward end mounting part of the fastening system. Movement of the hooking member between a non-engaged position wherein it lies adjacent the floor of the vehicle, to engagement with an appendage or the stretcher wherein the hooking member is in a raised and rearwardly displaced position, is effected by moving the handle longitudinally in a direction towards the rear of the vehicle. This action causes the attached rod and hooking member to simultaneously rotate through ninety degrees and move rearwardly. Rotation may be achieved by having the angular plate portion of the hooking member ride up over a wedge-shaped block which is formed integrally with the base plate and which retains the tubular housing.

In order to ensure that the hooking member is maintained in engagement with the stretcher appendage, the handle may be provided with lugs which slot into rearwardly facing recesses formed in flanges extending upwardly from the tubular housing base plate. Because these recesses face rearwardly, it is desirable to have a tensioning means to make sure that the lugs are firmly retained in the recesses. The tensioning means may take the form of a coil spring which is suitably positioned between a fixed location on the rod and the plate on the forward section of the mounting part. Movement of the hooking member rearwardly to its vertical engaging position, compresses this spring so that the lugs on the handle are biased into the recesses. Disengagement of the lugs from their accommodating recesses can only be achieved by exerting a rearward pull on the handle which is sufficient to overcome the tensioning force exerted by the coil spring.

The interconnecting actuating mechanism is simply a mechanism which enables the forward end mounting part to be actuated by the handle and to enable this part and the rear mounting part to act in unison so as to achieve simultaneous locking of the forward and rear sections of the stretcher The mechanism comprises the block which rotates the pivotal angled restraint and the linkage connecting the block to the rear mounting part In the preferred embodiment where there are two pivotal angled restraints and two blocks separated from one another on the ends of a common shaft, there are preferably two linkages which extend parallel to one another from spaced locations On the shaft to the aforementioned plate.

To accommodate the fastening system of the present invention, some stretchers may need to be slightly modified by incorporating an appendage such as a metal loop, on the rear end of their framework Such modification is generally of a very simple nature and does not require any substantial working on the framework of the stretcher.

BRIEF DESCRIPTION OF THE DRAWINGS

A preferred embodiment of the invention will now be described with reference to the accompanying drawings, in which.

DETAILED DESCRIPTION OF THE INVENTION

Referring to all the figures in which like parts are like numbered, the fastening system essentially comprises three parts—a forward end mounting part 10, a rear mounting part 11 and an interconnecting actuating mechanism 12.

Figure 2:
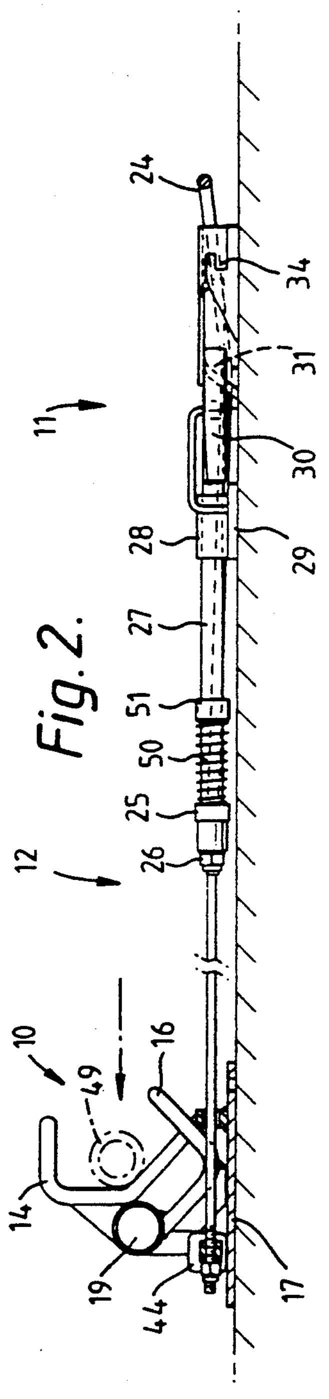
FIG. 2 is a sectional view of the fastening system depicted in FIG. 1 in an unlocked arrangement.
Figure 3:
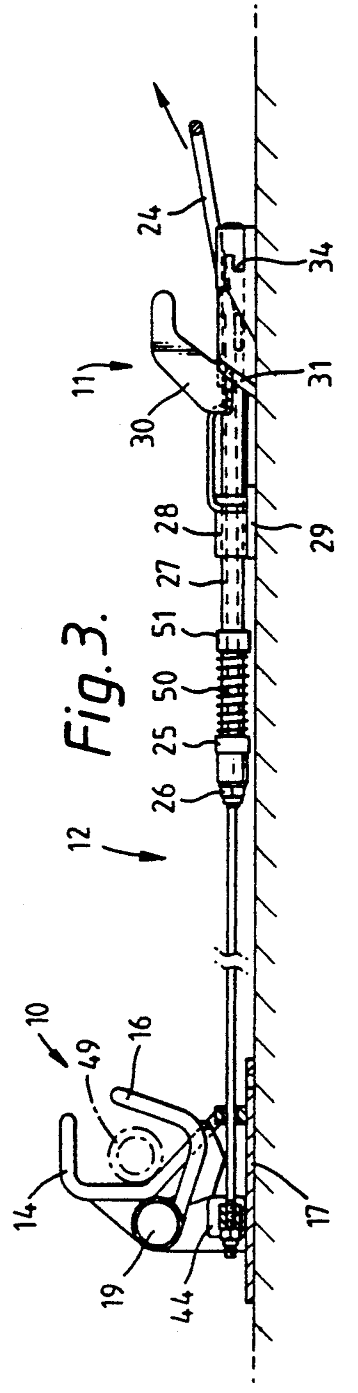
FIG. 3 is a sectional view of the fastening system depicted in FIG. 1 in an intermediate arrangement.
Figure 4:
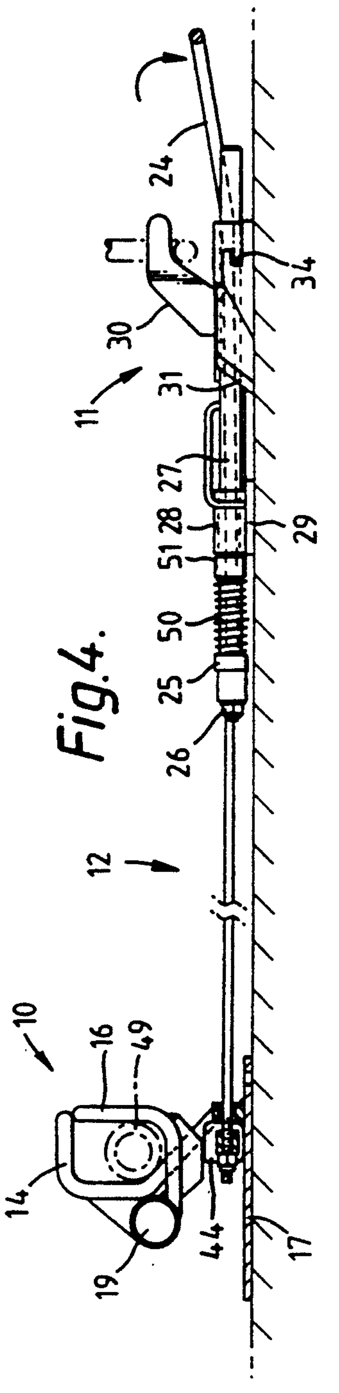
FIG. 4 is a sectional view of the fastening system depicted in FIG. 1 in a locked arrangement.
Figure 5:
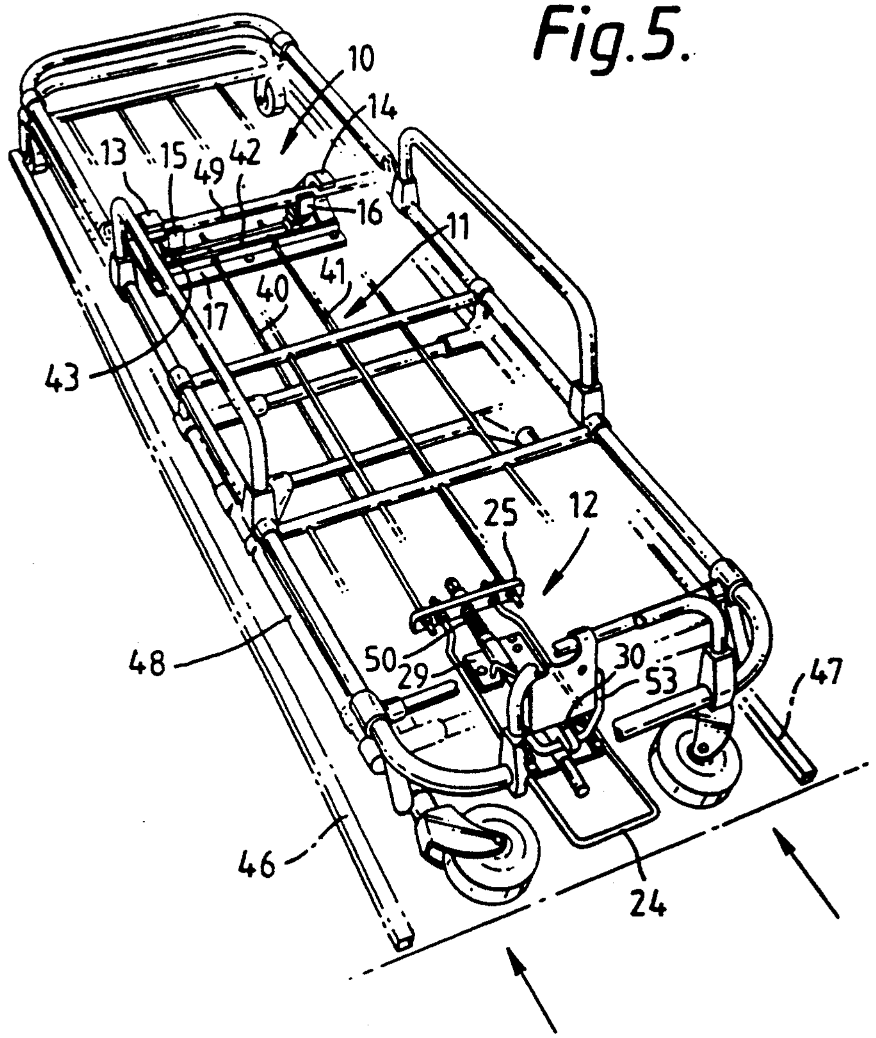
FIG. 5 is a perspective view of the fastening system depicted in Figure showing the placement of a stretcher in relation thereto.

The forward end mounting part 10 comprises two spaced apart fixed angled restraints 13, 14, and two pivotal restraints 15, 16. The fixed restraints 13, 14 are welded to a plate 17 so as to locate on each inner side of the stretcher as shown in FIG. 5. The pivotal restraints 15, 16 are pivoted to the inner sides of the fixed restraints by means of bolts 18, 19 upon which they can rotate as shown in FIGS. 2–4.

The rear end mounting part 11 comprises a handle 24 connected at its forward end to a plate 25 which, in turn, is joined to the interconnecting actuating mechanism 12.

A rod 27 retained by bolt 26 to plate 25, is moveable in a longitudinal direction within housing 28, upon movement of the handle 24 longitudinally. The housing 28 is adapted for securement to the floor of a vehicle by fixed base plate 29. A hooking member 30 is welded to the rod 27 and a wedge shaped block 31 acts as a pivotal guide for the hooking member when it moves from the position depicted in FIG. 2 to the position depicted in FIG. 4 as hereinafter described.

Lugs 32,33 are provided on each side of the handle 24 which are dimensioned to slot into recesses 34, 35, formed in flanges 36, 37 welded to base plate 29.

Tensioning of the lugs in the recesses, as described below, is effected by coil spring 50 which is held on rod 27 by fixture 51.

The interconnecting actuating mechanism 12 comprises two levers 40, 41, shaft 42 and blocks 43, 44. The levers are connected to the plate 25 by bolts 45, 45a.

Figure 1:
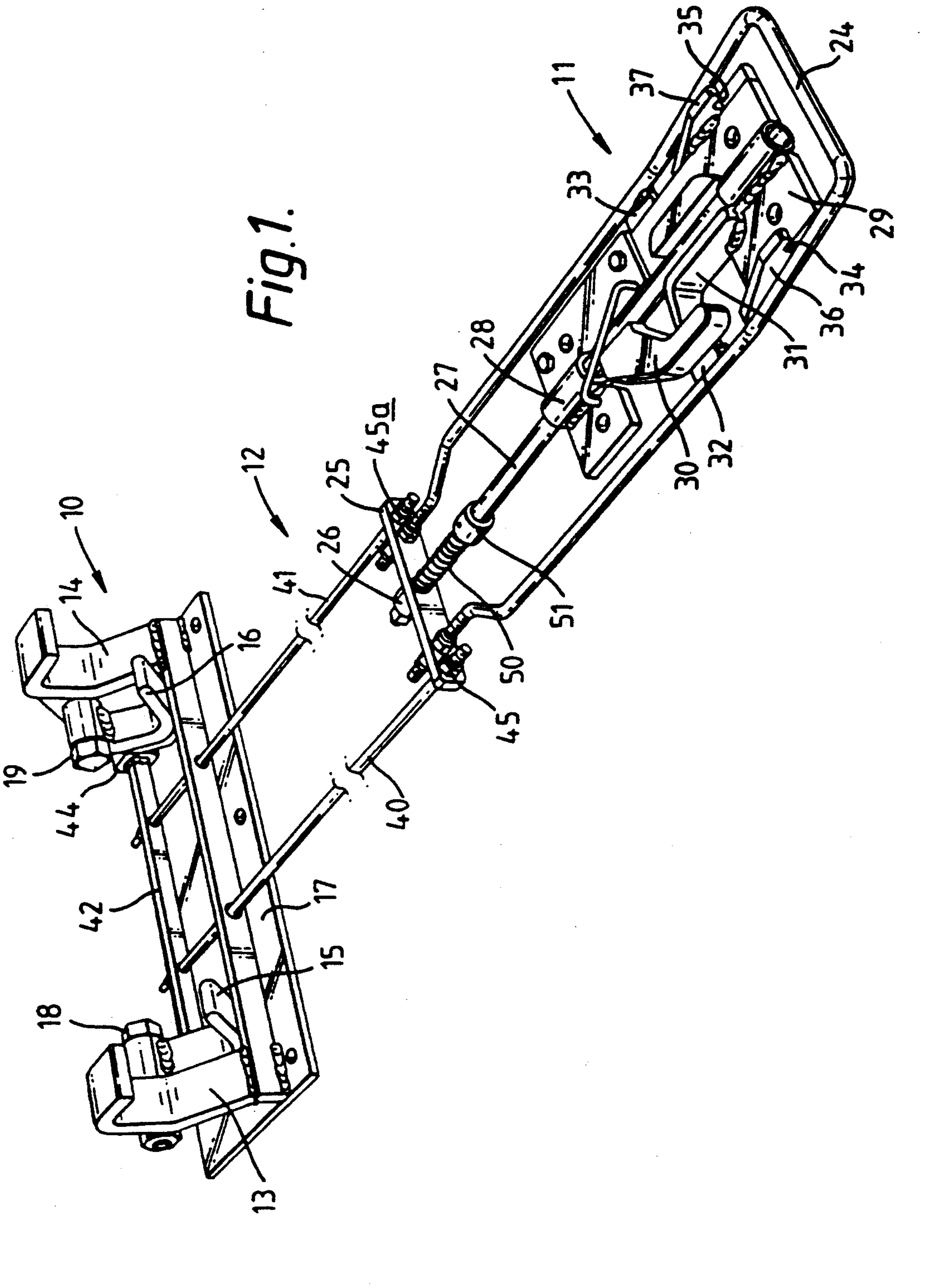
FIG. 1 is a perspective view from above of a fastening system according to the present invention.

The stretcher fastening system is bolted to the floor of a vehicle centrally between floor runners 46, 47 as depicted in FIG. 5, and when not in use assumes the configuration depicted in FIGS. 1 and 2.

Upon loading a stretcher 48, contact is first made between a cross-member 49 of the stretcher frame and the two angled fixed restraints 13, 14 as shown in FIG. 2, and the movement of the stretcher is halted. The handle 24 is then raised and moved rearwardly, pulling the blocks 43, 44, via the interconnecting actuating mechanism 12, under the angled pivot restraints 15 and 16, and causing the pivot restraints to be locked in an upward position as shown in FIG. 3 until the position shown in FIG. 4 is reached. At this point the coil spring 50 is under compression and the lugs 32, 33 on the handle are slotted into the recesses 34, 35 in the upstanding flanges 36, 37 for firm retention of the stretcher. Simultaneously, as the handle 24 has been pulled rearwardly, the hooking member 30 has ridden up over the wedge shaped block 31 to the vertical Orientation shown in FIG. 3 and then moved rearwardly to the location shown in FIGS. 4 and 5 to engage within an anchor loop 53 fitted to the framework of the stretcher.

Release of the stretcher is effected by pulling the handle 24 rearwardly so as to overcome the tension in the coil spring 50 and to release the lugs 32, 33 from their slotted recesses. The handle is then pushed forward with the aid of the coil spring to dislodge the blocks 43, 44 from the angled pivotal restraints 15, 16. The pivotal restraints are then free to pivot to the orientation depicted in FIG. 2. Simultaneously, the hooking member is guided to the position depicted in FIGS. 1 and 2, and the stretcher can be removed without hindrance.

Whilst the above has been given by way of illustrative example of the invention, many modifications and variations may be made thereto by persons skilled in the art without departing from the broad scope and ambit of the invention as herein set forth in the following claims.

THE CLAIMS DEFINING THE INVENTION ARE AS FOLLOWS:

1. A stretcher frame securing system for a patient transport vehicle having a rearwardly located patient access, said system comprising a part for mounting on the floor of the transport vehicle adjacent said access, a part for mounting on the floor forwardly of said access, and an actuating mechanism connecting said parts; said forwardly mounting part including fixed and pivotal angled restraints for securing a stretcher frame wherein said fixed angled restraint inclines upwardly and rearwardly in a direction toward said vehicle access and said pivotal angled restraint is adapted to pivot between an orientation in which it inclines downwardly and rearwardly to said vehicle access, and an orientation in which it inclines upwardly and forwardly of said vehicle; said part adjacent the access including a longitudinally movable handle and associated hooking member which pivots between a horizontal plane and a vertical plane upon movement of the handle in a direction toward said access, said pivotal action of said hooking member being accompanied by a longitudinal movement which takes the hooking member into and out of locking correspondence with an appendage on the rear section of the stretcher; said interconnecting actuating mechanism acting to pivot said pivotal angled restraint upon longitudinal movement of the handle, so that the pivotal angled restraint in combination with the fixed restraint secures the stretcher frame therebetween.

2. A stretcher frame securing system as claimed in claim 1, wherein there are two fixed and two pivotal angled restraints at spaced lateral locations.

3. A stretcher frame securing system as claimed in claim 1, wherein the fixed and pivotal angled restraints are fitted to a common plate which is adapted for bolting through the floor of the patient transport vehicle.

4. A stretcher frame securing system as claimed in claim 1 wherein said pivotal angled restraint is fitted by means of a pivot pin to the inner side of a respective fixed angled restraint.

5. A stretcher frame securing system as claimed in claim 1, wherein said pivotal angled restraint is pivoted between its orientations by movement of a block under a lower surface thereof by way of said actuating mechanism.

6. A stretcher frame securing system as claimed in claim 5, wherein when there are two pivotal angled restraints, each associated block is formed on the end of a common shaft.

7. A stretcher frame securing system as claimed in claim 1, wherein the handle is a solid looped rod with a grip portion extending transversely with respect to the vehicle.

8. A stretcher frame securing system as claimed in claim 7, wherein the handle is connected at its forward end to the actuating mechanism through the intermediary of a rectangular plate, which rectangular plate retains one end of a spring-loaded rod, said rod having the hooking member formed on its other end, and said spring ac ting to bias the hooking member against the appendage on the rear section of the stretcher.

9. A stretcher frame securing system as claimed in claim 8 wherein said spring loaded rod is moveable in a longitudinal direction within a tubular housing which is adapted for bolting to the floor of the vehicle.

10. A stretcher frame securing system as claimed in claim 1, wherein the hooking member comprises an angular plate with a portion thereof extending substantially parallel to the floor of the vehicle in a direction pointing towards the patient access.

11. A stretcher frame securing system as claimed in claim 1, wherein the actuating mechanism includes one or more rods connecting the handle of the means for pivoting the pivotal angled restraint.

12. A stretcher frame securing system as claim in claim 2, wherein the fixed and pivotal angled restraints ar fitted to a common plate which is adapted for bolting through the floor of the patient transport vehicle.

13. A stretcher frame securing system as claim in claim 2, wherein each pivotal angled restrain is fitted by means of a pivot pin to the inner side of a respective fixed angled restraint.

14. A stretcher frame securing system as claim in claim 3, wherein said pivotal angled restrain is fitted by means of a pivot pin to he inner side of a respective fixed angled restraint.

15. A stretcher frame securing system as claim in claim 2, wherein each pivotal angled restraint is pivoted between its orientations by movement of a block under a lower surface thereof by way of said actuating mechanism.

16. A stretcher frame securing system as claim in claim 3, wherein said pivotal angled restraint is pivoted between its orientations by movement of a block under a lower surface thereof by way of said actuating mechanism.

17. A stretcher frame securing system as claim in claim 4, wherein said pivotal angled restraint is pivoted between its orientations by movement of a block under a lower surface thereof by way of said actuating mechanism.

18. A stretcher frame securing system as claim in claim 2, wherein the handle is a solid looped rod with a grip portion extending transversely with respect to the vehicle.

19. A stretcher frame securing system as claimed in claim 3, wherein the handle is a solid looped rod with a portion extending transversely with respect to the vehicle.

20. A stretcher frame securing system as claimed in claim 2, wherein the actuating mechanism includes two rods connecting the handle to the means for pivoting the pivotal angled restraints.

* * * * *

UNITED STATES PATENT AND TRADEMARK OFFICE
CERTIFICATE OF CORRECTION

PATENT NO. : 5,205,601

DATED : April 27, 1993

INVENTOR(S) : Kenneth R. Ferris

It is certified that error appears in the above—identified patent and that said Letters Patent is hereby corrected as shown below:

ON THE TITLE PAGE:

[54] Title; delete "AMBULANCE LOCK" and insert --STRETCHER SECURING SYSTEM FOR PATIENT TRANSPORT VEHICLE--

In column 6, claim 8, line 17, delete "ac ting" and insert --acting--

In column 6, claim 12, line 34, delete "ar" and insert --are--

In column 6, claim 14, line 42, delete "he" and insert --the--

In column 6, claim 15, line 44, delete "claim" and insert --claimed--

In column 6, claim 16, line 49, delete "claim" and insert --claimed--

In column 6, claim 17, line 54, delete "claim" and insert --claimed--

In column 6, claim 18, line 59, delete "claim" and insert --claimed--

Signed and Sealed this

Twenty-fifth Day of January, 1994

*Attest:*

Bruce Lehman

BRUCE LEHMAN

*Attesting Officer* *Commissioner of Patents and Trademarks*